United States Patent
Troitsky et al.

(10) Patent No.: US 11,388,148 B2
(45) Date of Patent: Jul. 12, 2022

(54) SYSTEM AND METHOD OF ANONYMOUS SENDING OF DATA FROM A USER DEVICE TO A RECIPIENT DEVICE

(71) Applicant: AO Kaspersky Lab, Moscow (RU)

(72) Inventors: Artem V. Troitsky, Moscow (RU); Andrey V. Ladikov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 16/994,032

(22) Filed: Aug. 14, 2020

(65) Prior Publication Data
US 2021/0266297 A1 Aug. 26, 2021

(30) Foreign Application Priority Data

Feb. 26, 2020 (RU) .......................... RU2020108168

(51) Int. Cl.
*H04L 9/40* (2022.01)
*G06F 21/62* (2013.01)

(52) U.S. Cl.
CPC ...... *H04L 63/0421* (2013.01); *G06F 21/6254* (2013.01); *H04L 63/0853* (2013.01)

(58) Field of Classification Search
CPC ............. H04L 63/0421; H04L 63/0853; G06F 21/6254
See application file for complete search history.

(56) References Cited

U.S. PATENT DOCUMENTS

| | | | |
|---|---|---|---|
| 8,015,117 B1 * | 9/2011 | Lillibridge | G06Q 30/02 705/64 |
| 8,739,265 B2 | 5/2014 | Ang et al. | |
| 2001/0054155 A1 * | 12/2001 | Hagan | H04L 69/329 713/193 |
| 2008/0005264 A1 | 1/2008 | Brunell | |
| 2010/0199098 A1 * | 8/2010 | King | H04L 9/0866 713/182 |
| 2011/0161422 A1 * | 6/2011 | Bender | G06Q 20/383 709/204 |

(Continued)

OTHER PUBLICATIONS

Domingo-Ferrer et al., "Steered Microaggregation as a Unified Primitive to Anonymize Data Sets and Data Streams", Dec. 2019, IEEE Transactions on Information Forensics and Security, vol. 14, No. 12, pp. 3298-3311 (Year: 2019).*

*Primary Examiner* — Kenneth W Chang
(74) *Attorney, Agent, or Firm* — ArentFox Schiff LLP; Michael Fainberg

(57) ABSTRACT

Disclosed herein are systems and methods for anonymous sending of data from a source device to a recipient device. In one aspect, an exemplary method comprises, by the source device: receiving a request to send data to the recipient device, processing the data such that an identifier of the user and identification data are not linked to the data to be sent to the recipient, and determining whether the identifier of the user is absent in the source device, when the identifier of the user is absent, generating the identifier of the user, sending the identifier of the user to a token generator, wherein the sent identifier comprises either the generated identifier or an existing identifier found during the determination of whether the identifier is absent in the source device, and sending, to the recipient device, a combination of a random token received from the token generator and the data.

20 Claims, 10 Drawing Sheets

(56) References Cited

U.S. PATENT DOCUMENTS

| | | | |
|---|---|---|---|
| 2011/0213822 A1* | 9/2011 | Yavilevich | H04L 67/02 709/202 |
| 2011/0255688 A1* | 10/2011 | Spalink | H04L 63/0823 380/29 |
| 2014/0122866 A1 | 5/2014 | Haeger et al. | |
| 2014/0164111 A1 | 6/2014 | Rodriguez | |
| 2015/0101062 A1* | 4/2015 | Silver | G06Q 30/02 726/26 |
| 2016/0142380 A1 | 5/2016 | Fuller et al. | |
| 2018/0048472 A1 | 2/2018 | Pirrwitz et al. | |

\* cited by examiner

SYSTEM AND METHOD OF ANONYMOUS SENDING OF DATA FROM A USER DEVICE TO A RECIPIENT DEVICE

CROSS REFERENCE TO RELATED APPLICATIONS

The present application claims priority to Russian Patent Application No. 2020108168, filed on Feb. 26, 2020, the entire content of which is incorporated herein by reference.

FIELD OF TECHNOLOGY

The present disclosure relates to the field of anonymization and systems for protecting the confidentiality of user data and ensuring privacy.

BACKGROUND

An individual approach to convey information to a consumer has always been the best way of conveying information. This approach has long been the decisive factor in the most successful marketing campaigns. As ever increasing opportunities appeared for an individual approach to reach a client, direct marketing gained broad popularity at the end of the 20th century. The growth of digital technologies is providing ever newer tools for this. At present, many surveys of marketing experts in recent months reveal that improving personalization is a paramount goal for the near future.

Behavioral personalization identifies the behavior of a person using information received through various data collecting points, such as information received when the person is visiting a web site, emailing a correspondence, searching and consuming certain content, or visiting certain departments of a store. All of the information can be incorporated into a predictive model that enables making decisions in real time. But in developing these mechanisms, advertising networks constantly encounter the problem of confidentiality. The volume of information about customers, which is gathered by companies, is simply immense, and numerous problems arise in connection with the keeping of the gathered personal information and the guarantee of anonymity.

Various analytical utilities and trackers may be used for gathering user data, wherein the user data is html and js code embedded on the page of a network resource. Each tracker has its own domain, so that the identifier of a user within one tracker is an arbitrary identifier kept in a cookie at the client. Data of varying completeness may be gathered depending on the functionality of the tracker. For example, for a user registered through email it is possible to link the identifier to a mailing address, and in the case of search queries, it is possible to gather a group of interests of the user. In order to increase the completeness of the user profile, data from different trackers is gathered in a common database, or in a system for storing and managing of data, such as a Data Management Platform, or DMP. In order to link the data having different identifiers from cookies of the same user, a mechanism for synchronization of the cookie files is used. In the general case, the synchronization of cookies is done in both directions and it may involve a group of data management systems. The data management systems produce a redirecting to other systems, transferring the content of their cookie file as the parameter of the network address. This makes it possible to match up two identifiers, one being sent in a cookie file, the other in the parameter of the network address in the system where the redirecting is done. As a result of the synchronization process, the DMP will have a user profile assembled from several sources and thus containing the identifiers of a user from cookies in different systems. The systems participating in the synchronization may also obtain the identifier of a user from the DMP. An especially urgent problem is the synchronization between data management systems of Supply Side Platform (SSP) type and DMP type. Since an SSP puts out its identifier on the market place, the data in Demand Side Platforms (DSP) participating in the auction is linked to the identifiers of the DMP.

In view of the advent of new laws in the area of personal data (such as the General Data Protection Regulation, or GDPR), it is becoming necessary to ensure confidentiality and protect the advertising mechanisms described above. It follows from an analysis that certain mechanisms which can hide the actual identifiers are already known. However, these mechanisms require an installation of an additional agent on the user's device; in turn, the installation of the additional agent complicates the operations of a user with a remote server and renders the interaction nontransparent.

Thus, there is a need for a more optimal way of anonymously sending data from a source device (which is the user device) to a recipient device.

SUMMARY

Aspects of the disclosure relate to anonymization of data, more specifically, to systems and methods for anonymously sending data from a source device (user device) to a recipient device.

In one exemplary aspect, a method is provided for anonymous sending of data from a source device to a recipient device, the method comprising: by the source device, receiving a request to send data to the recipient device, processing the data such that an identifier of the user and identification data are not linked to the data to be sent to the recipient, and determining whether the identifier of the user is absent in the source device, when the identifier of the user is absent, generating the identifier of the user, sending the identifier of the user to a token generator, wherein the sent identifier comprises either the generated identifier or an existing identifier found during the determination of whether the identifier is absent in the source device, and sending, to the recipient device, a combination of a random token received from the token generator and the data.

In one aspect, the request for sending data to the recipient device is initiated when a script is being executed on the source device.

In one aspect, determining whether the identifier of the user is absent in the source device comprises determining whether or not cookies have been installed on the source device.

In one aspect, the processing of the data such that the identifier of the user and the identification data are not linked to the data to be sent to the recipient device includes: separating the identifier of the user and the identification data from the data to be sent, such that the identifier of the user and the identification data are unlinked from the data to be sent.

In one aspect, the unlinking is performed by a data modifier.

In one aspect, the identifier of the user is generated by the source device or by a third party, wherein when the identifier of the user is generated by the third party, the method further comprises: sending, from the third party, the generated identifier of the user to the source device.

In one aspect, the method further comprises: by the token generator, determining whether an existing anonymous identifier is linked to the received identifier of the user, when no link is found to an existing anonymous identifier, creating a pair of the received identifier of the user and an anonymous identifier, generating a random token either for the created pair or the existing pair, wherein the random token links the received identifier of the user to the anonymous identifier, when the random token is received from the recipient device, mapping the random token onto the anonymous identifier using the pair for which the token was generated, and returning the anonymous identifier to the recipient device from which the random token is received.

In one aspect, the identifier of the user is linked distinctly to the anonymous identifier.

In another aspect, the identifier of the user is linked to the anonymous identifier via a one to many link, wherein one of the following is true: several identifiers of the user are linked to one anonymous identifier, identifiers of at least two users are linked to a same anonymous identifier, and several anonymous identifiers are linked to a same identifier of the user.

In one aspect, the method further comprises, by the recipient device: sending the random token received from the source device to the token generator, receiving, from the token generator, the anonymous the anonymous identifier, and combining the data received from the source device with the anonymous identifier received from the token generator.

In one aspect, when the returned anonymous identifier is already known to the recipient device, the recipient device saves the data obtained from the source in a structure previously created for the known anonymous identifier, and when the returned anonymous identifier is unknown to the recipient device, the recipient device creates a new structure for saving the data obtained from the source device in relation to the current anonymous identifier.

According to one aspect of the disclosure, a system is provided for anonymously sending data from a source device (the user device) to a recipient device, the system comprising a hardware processor configured to: receive a request to send data to the recipient device, process the data such that an identifier of the user and identification data are not linked to the data to be sent to the recipient, and determine whether the identifier of the user is absent in the source device, when the identifier of the user is absent, generate the identifier of the user, send the identifier of the user to a token generator, wherein the sent identifier comprises either the generated identifier or an existing identifier found during the determination of whether the identifier is absent in the source device, and send, to the recipient device, a combination of a random token received from the token generator and the data.

In one exemplary aspect, a non-transitory computer-readable medium is provided storing a set of instructions thereon for anonymously sending data from a user device to a recipient device, wherein the set of instructions comprises instructions for: receiving a request to send data to the recipient device, processing the data such that an identifier of the user and identification data are not linked to the data to be sent to the recipient, and determining whether the identifier of the user is absent in the source device, when the identifier of the user is absent, generating the identifier of the user, sending the identifier of the user to a token generator, wherein the sent identifier comprises either the generated identifier or an existing identifier found during the determination of whether the identifier is absent in the source device, and sending, to the recipient device, a combination of a random token received from the token generator and the data.

The method and system of the present disclosure are designed to provide data security for information being sent from a user device to a recipient.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for anonymous exchange of data between a source device and a recipient device. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In one aspect, the present disclosure describes a system for sending data from a source device to a recipient device in an anonymized manner. The systems 100, 400 and 700 (described below) is implemented on a computing system (e.g., a computer), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 10). Furthermore, the system components may be realized either within a single computing device or spread out among several interconnected computing devices.

The method of the present disclosure enables management of the data that is being gathered and enables the link between the user and the data management systems to be broken. The method is performed without installing a cookie file and without the need to obtain the consent of the user for each installation. The law gives the user the right to withdraw permission for the processing of data. The present disclosure provides a technical solution for realizing this right "by a single click" for an unlimited number of trackers. Moreover, the method of the present disclosure can be incorporated in an existing mechanism of an RTB (real time bidding).

Figure 1:
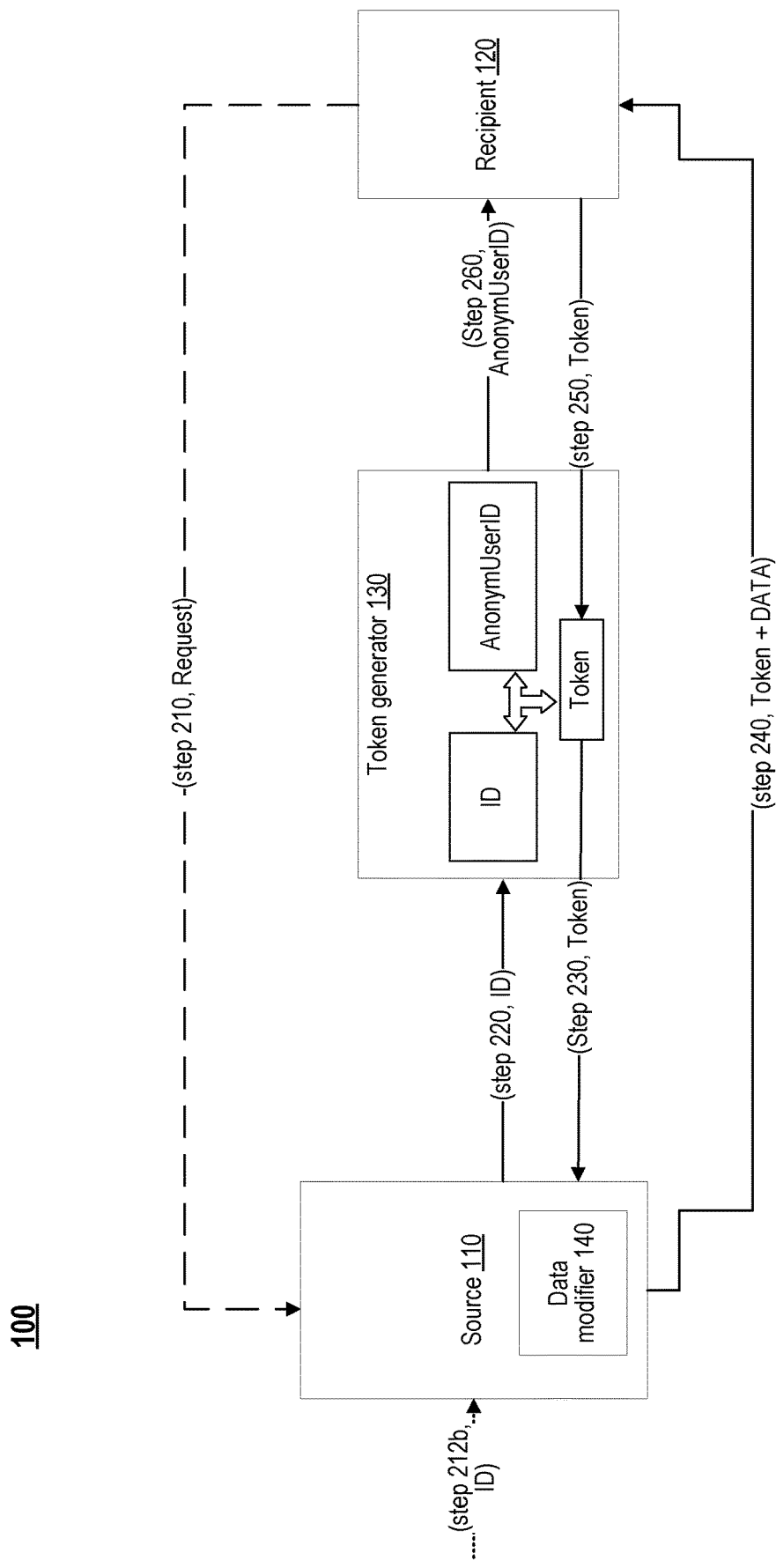
FIG. 1 illustrates a system for anonymous exchange of data.

FIG. 1 illustrates a system 100 for anonymous exchange of data. The system includes a data source 110, a data recipient 120, and a token generator 130 that generates the token from the data. Data is stored at the source 110 and is provided on demand to the recipient 120. The token generator 130 that generates the token from the data is designed to create linkages:

user identifier↔anonymous identifier, critical data↔anonymous data.

The token generator 130 thus generates random tokens for these linkages. The token generator can transform the user identifier data and critical data in both directions, the result of the transformation being anonymous identifiers or anonymous data. In a particular instance, the methods of transformation of the data include at least one of:

quantization;
sorting;
merging (pasting);
grouping;
data set configuration;
table substitution of values;
calculated values;
data encoding;
encryption;
normalization (scaling); and
convolution.

In one aspect, the transformation is done with no possibility of restoring back to a previous form by any means other than the anonymization means of the node. The restoration (i.e., back transformation) refers to a transformation that allows restoration of an object (data, structure, etc.) to the original form of the object. The original form of the object refers to the form of the object prior to the transformation. Transformation refers to a mapping (function) of a set onto itself or, in other words, mappings that convert a certain set into another set are known as transformations.

In a particular instance, the token generator 130 is located on a node of a network different from the network of the recipient and/or the source. In a particular instance, the node with the token generator is located in a regional network, which is different from the regional network on which the recipient is located. Furthermore, the token generator is not located in a same intranet as the recipient or the source. It is noted that the regional network refers to a geographically decentralized network which bring together computers at different points forming a single unit for enabling communication. In turn, the aggregate of the regional networks forms a global network. Thus, the various elements of the system may be located in different jurisdictions. In the context of the present disclosure, different regional networks are not only geographically disparate, but are also located in different jurisdictions. Different regional networks may include networks bringing together the nodes of countries (national networks). In the terminology of the GDPR (General Data Protection Regulation), for example, a regional network of the Russian Federation in which a server is located will be considered a regional network of a third party country. In a particular instance, the regional network of a node with the token generator is thus also different from the regional network of the client.

In one aspect, the data sources 110 may be clients, different user devices, Internet of Things (IoT) devices or data management systems, such as a user database which aggregates and stores all data about a user and which the user manages through an interface. In one aspect, the recipients may be servers, data management systems, including Customer Data Platform (CDP), Data Management Platform (DMP), Supply Side Platform (SSP), Demand Side Platform (DSP), and so forth. In a particular instance, the reverse situation is possible, where the sources become recipients, and the recipients become sources. For example, in the RTB technology, when the user device obtains an advertising block from a SSP, the SSP is the source, and the user device is the recipient.

FIG. 1 shows an example of a system for an interaction between a data source 110 (source device) and a data recipient 120 (recipient device). The interaction is in accordance with the method described in conjunction with FIG. 2. For example, the interaction includes a scenario wherein:

the recipient requests data from the source (See e.g., step 210);

the source sends an identifier to the token generator (See e.g., step 220);

the token generator returns the random token to the source (See e.g., step 230);

the source sends the requested data, combined with the token, to the recipient (See e.g., step 240);

the recipient sends the random token to the token generator (See e.g., step 250); and the token generator returns the anonymous identifier to the recipient (See e.g., step 260).

Figure 2:
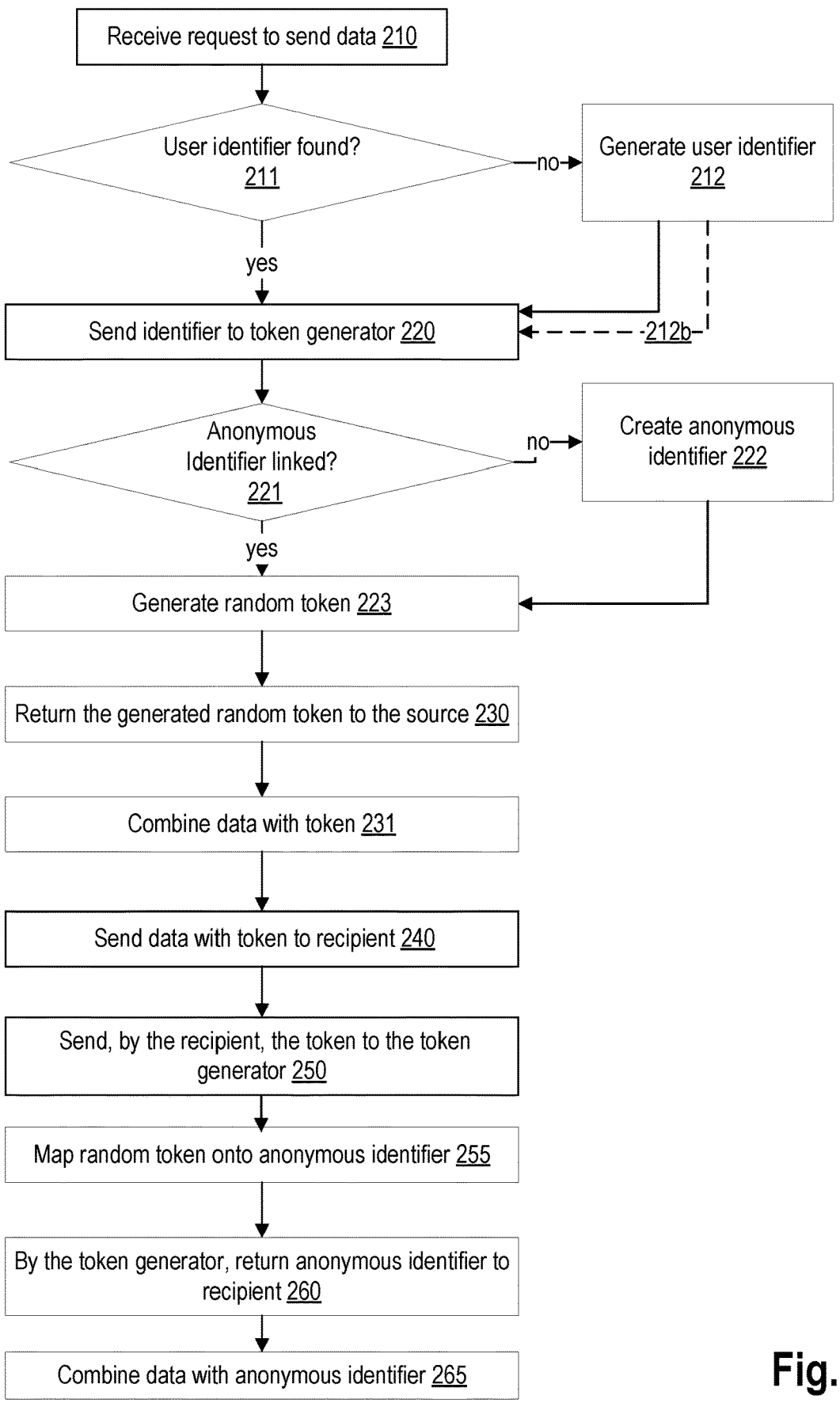
FIG. 2 illustrates an exemplary method for obtaining data by a recipient from a source in accordance with aspects of the present disclosure.

FIG. 2 illustrates an exemplary method 200 for sending data from a source to a recipient in accordance with aspects of the present disclosure.

In step 210, the source 110 receives a request from to send data to the recipient 120. In one aspect, the request to send data may be initiated not by the recipient 120, but rather within the source 110 itself. For example, when a script is being executed on the user's device, a sending of data to a web server or DMP may be initiated.

In step 211, the source 110 processes the data such that an identifier of the user and any other identification data is not linked to the data to be sent to the recipient and determines whether the identifier of the user is absent. When the identifier of the user is absent, the method proceeds to step 212. Otherwise, the method proceeds to step 220.

In one aspect, determining whether or not the identifier of the user is absent comprises determining whether or not cookies have been installed or are absent.

In one aspect, the processing of the data such that the identifier of the user and any other identification data are not linked to the data being sent includes: separating the identification data (including the identifier of the user) from the data being sent (i.e., unlinking). In one aspect, the unlinking is performed by a data modifier 140, in response to a request by the source 110.

In step 212, the method generates the identifier of the user. In one aspect, the identifier of the user is generated by the source 110. In another aspect, the identifier of the user is generated by a third party (such as: DMP, SSP, web server, database, etc.). If the identifier of the user is generated by the third party, the method proceeds to step 212b to send the generated identifier of the user to the source 110.

In step 220, the source 110 sends the identifier of the user (either the identifier generated in step 212 or the existing one found in step 211) to the token generator 130.

In step 221, the token generator 130 determines whether an existing anonymous identifier is linked to the received identification data. If no link is found to an existing anonymous identifier, the method proceeds to step 222. Otherwise, the method proceeds to step 223.

In step 222, the method creates a pair user identifier/anonymous identifier and proceeds to step 223.

In one aspect, the user identification data is linked distinctly to the anonymous identifier (one to one link, or injection). In another aspect, the link is not distinct (i.e., the link is one to many):

- several identifiers of the same user are linked to one anonymous identifier (for example, when the same user has identifiers in several systems);
- the identifiers of several users are linked to the same anonymous identifier (for example, when an anonymous identifier characterizes a certain group of people—a family or colleagues—or the identifier characterizes a consumer segment); and
- several anonymous identifiers are linked to the same user identifier (for example, when required to provide a controlled collision of identifiers for depersonalization and to guarantee that back transformation is impossible).

In step 223, the token generator 130 generates a random token for the pair user identifier/anonymous identifier, wherein the random token links the user identifier to the anonymous identifier.

In step 230, the token generator 130 returns the generated random token to the source 110.

In step 231, the source 110 combines the random token with the data intended for the recipient.

In step 240, the data with the random token combined therein is sent to the recipient 120.

In step 250, the recipient 120 sends the random token received from the source 110 to the token generator 130.

In step 255, the token generator 130 maps the random token received from the recipient 120 onto the anonymous identifier using the pair user identifier/anonymous identifier for which the token was generated.

In step 260, the token generator 130 returns the anonymous identifier to the recipient 120.

In step 265, the recipient combines the data with the anonymous identifier. In one aspect, when the returned anonymous identifier was already known to the recipient 120, the data obtained from the source 110 is saved in a structure previously created for this anonymous identifier; otherwise, a new structure is created for saving the data obtained from the source 110 in related to the current anonymous identifier. Several anonymous identifiers are created for the same user identifier when it is necessary to guarantee the anonymity of the user. In this case, the same user identifier is mapped onto several anonymous identifiers, thereby not allowing the data to be combined under the same identifier. In other words, mapping the same user identifier onto several anonymous identifiers prevents the user from being de-anonymized at the recipient's side.

Figure 3:
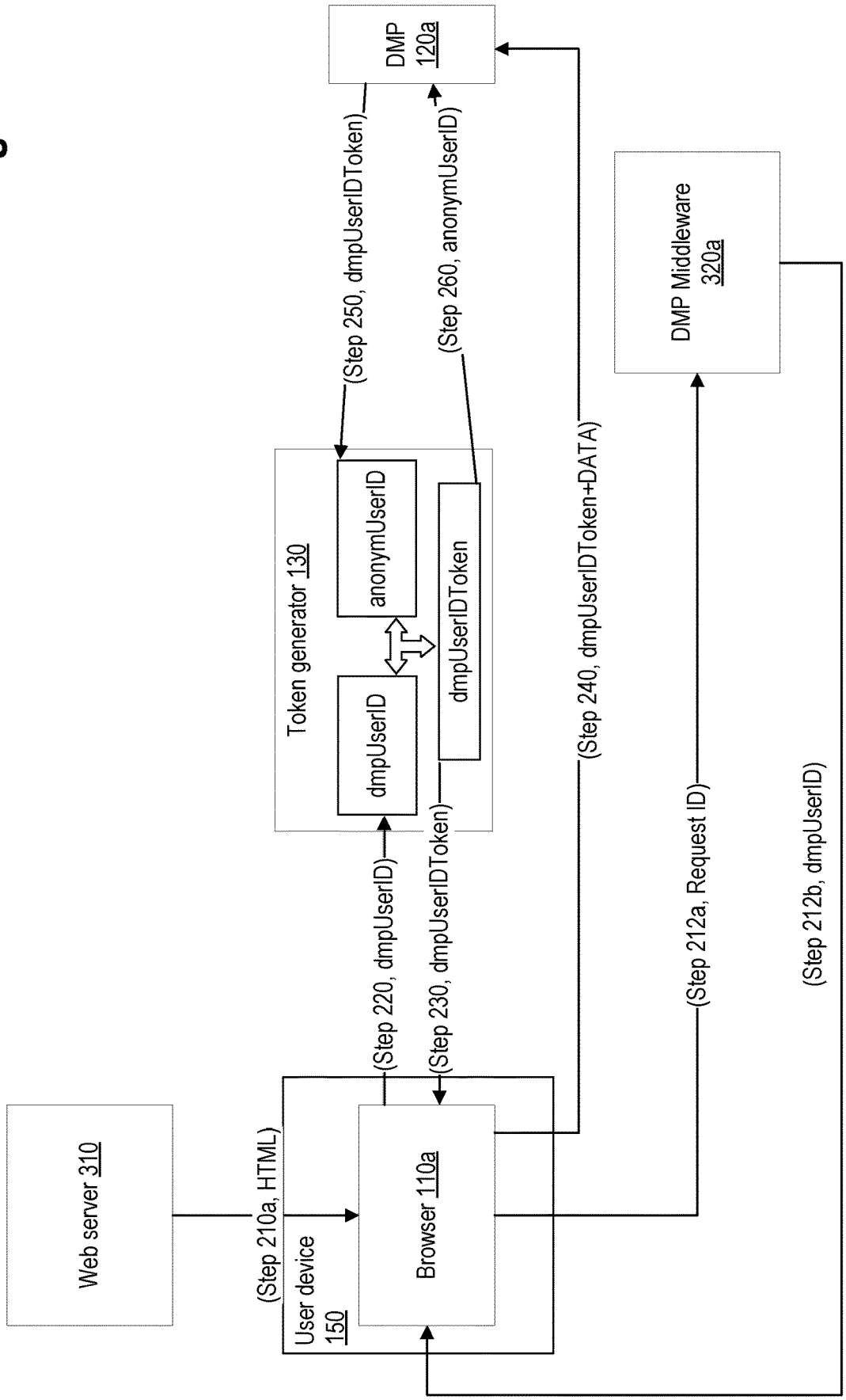
FIG. 3 illustrates an exemplary implementation of the method for obtaining data by a recipient from a source in accordance with aspects of the present disclosure.

FIG. 3 illustrates an exemplary implementation of the method for obtaining data by a recipient from a source in accordance with aspects of the present disclosure. FIG. 3 shows a variant of the method, described above, for sending data, which is a collection of DMP data.

In step 210a, a browser receives an html page with scripts from a web server 310. At least one of the scripts is designed to gather data from a user's device 150, on which the browser 110a is installed, and to send the data to a DMP 120a. For the sending of the data, it is necessary to generate a unique user identifier. In step 212a, the browser 110a generates a request and sends the request to DMP Middleware 320a. In step 212, the DMP Middleware 320a generates the user identifier dmpUserID. In step 212b, the DMP Middleware 320a returns the generated user identifier to the browser 110a. In step 220, the identifier dmpUserID is sent to the token generator 130. The token generator 130 determines whether an existing anonymous identifier is linked to the received identifier. If there is no linkage, the token generator 130 generates an anonymous identifier anonymUserID; otherwise, it uses the existing one. The random token dmpUserIDToken is then generated for the pair dmpUserID-anonymUserID. In step 230, the generated token dmpUserIDToken is returned to the user's device 150. The random token dmpUserIDToken is combined with the data DATA intended for the DMP. In step 240, the data DATA combined with the token dmpUserIDToken is sent to the DMP. In step 250, the token dmpUserIDToken from the DMP is sent to the token generator 130, where the token is mapped onto the anonymous identifier anonymUserID from the pair dmpUserID-anonymUserID for which the token was generated. Then, in step 260, the identifier anonymUserID is returned to the DMP. The data DATA is combined at the DMP 120a with the returned anonymous identifier anonymUserID. In one aspect, if the returned anonymous identifier was already known to the DMP, the data obtained from the web server is saved in a structure previously created for this anonymous identifier. In another aspect, the returned anonymous identifier is not known to the DMP and a new storage structure is created for the data linked to the anonymous identifier.

Figure 4:
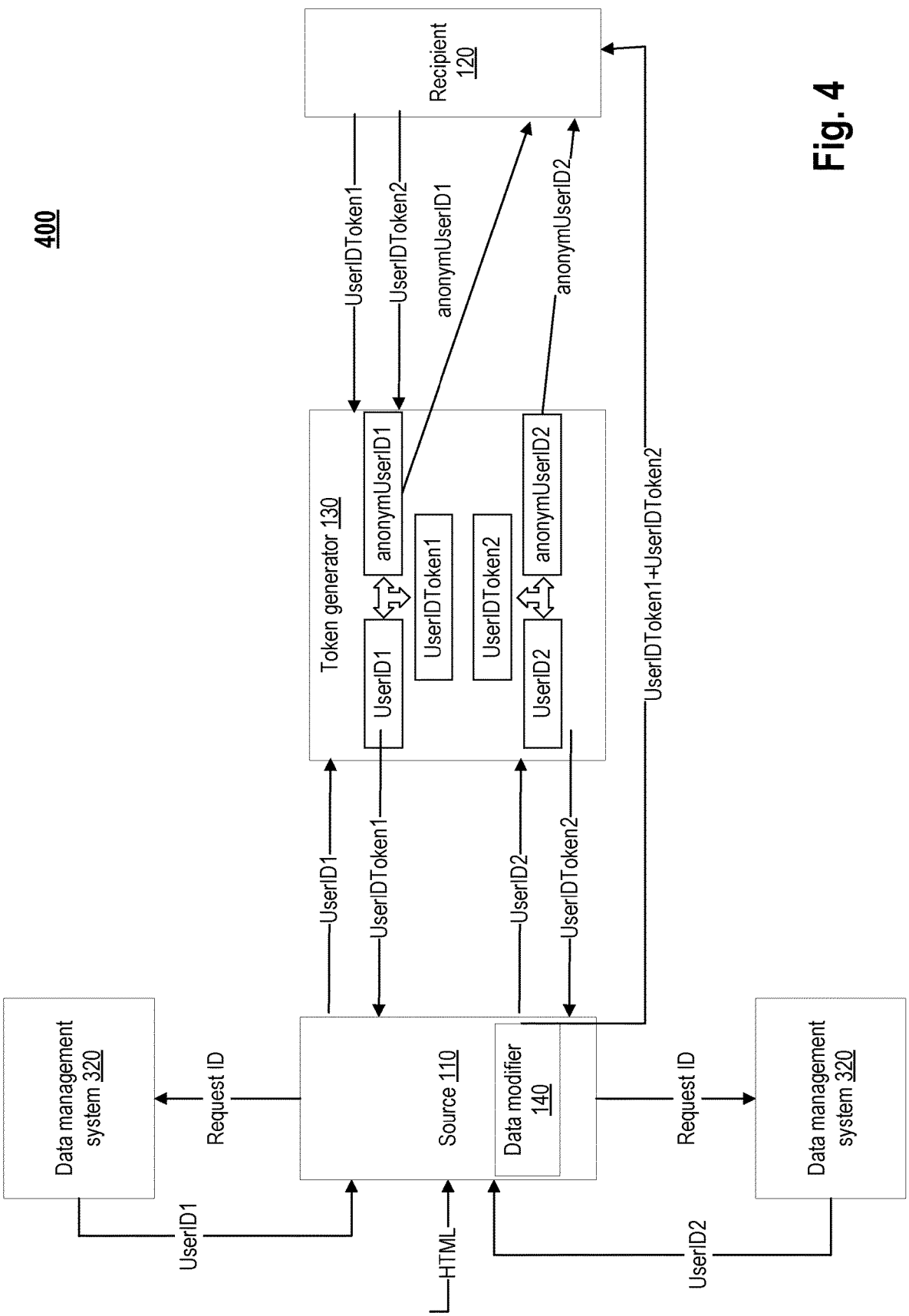
FIG. 4 illustrates a system for synchronization of anonymous identifiers in accordance with aspects of the present disclosure.

FIG. 4 illustrates a system 400 for synchronization of anonymous identifiers in accordance with aspects of the present disclosure. The system 400 is analogous to the system 100. In addition, the system 400 contains data management systems 320. There are at least two such data management systems for the synchronization. FIG. 4 shows an example of the interaction between a data source and a data recipient, where:

- the source 110 sends a request to obtain an identifier to a management system 320 (See e.g., step 212a);
- the system 320 returns the identifier to the source 110 (See e.g., step 212b);
- the source 110 sends the identifier to the token generator 130 (See e.g., step 220);
- the token generator 130 returns the random token to the source 110 (See e.g., step 230);
- the source 110 sends tokens to the recipient 120 (See e.g., step 242);
- the recipient 120 sends the token to the token generator 130 (See e.g., step 250); and the token generator returns the anonymous identifier to the recipient 120 (See e.g., step 260).

Figure 5:
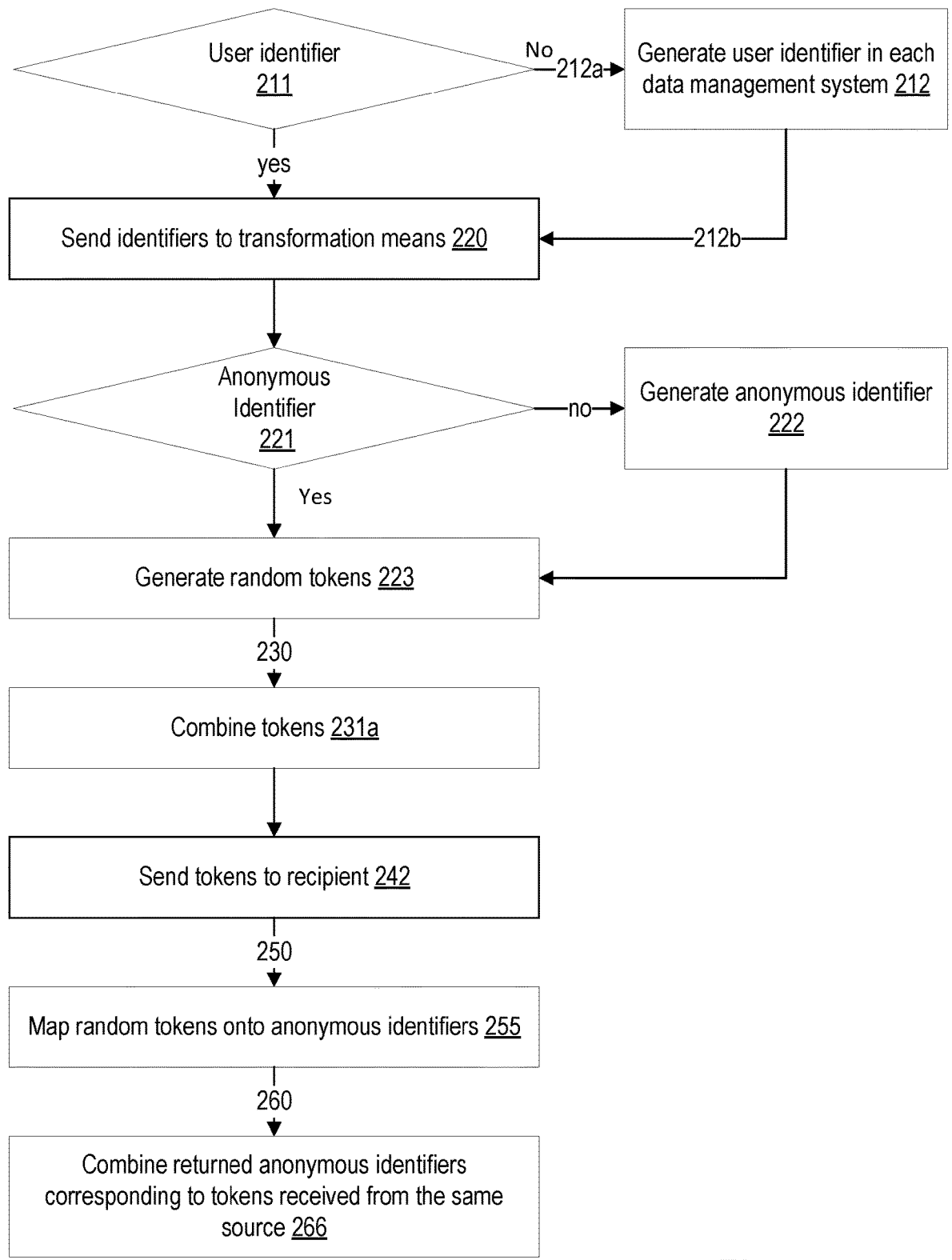
FIG. 5 illustrates a method for synchronization of anonymous identifiers in accordance with aspects of the present disclosure.

FIG. 5 illustrates a method for synchronization of anonymous identifiers in accordance with aspects of the present disclosure. If the source 110 has no identifiers for the synchronization, the source 110 sends a request 212a to receive an identifier to the management system 320; the system 320 generates the identifier in step 212 and returns the generated identifier to the source 110 (212b). In step 220, the source 110 sends the identifiers received from the system 320 to the token generator 130.

In step 221, the token generator determines whether there is an existing anonymous identifier linked with the received identification data. If there is no link, in step 222, an anonymous identifier is generated and linked to the identification data, as described above in the method 200. In step 223, a random token is generated for each pair user identifier/anonymous identifier. In step 230, this random token is returned to the source 110. In step 231a, all the tokens of the source 110 are combined. Then, in step 242, the combined tokens are sent to the recipient. In step 250, the tokens are sent from the recipient to the token generator 130. In step 255, the tokens are mapped (resolved) onto the anonymous identifiers from the pairs user identifier/anonymous identifier for which the tokens were generated. In step 260, the anonymous identifiers are returned to the recipient 120. In step 266, the anonymous identifiers corresponding to the tokens received from the same source are linked.

Figure 6:
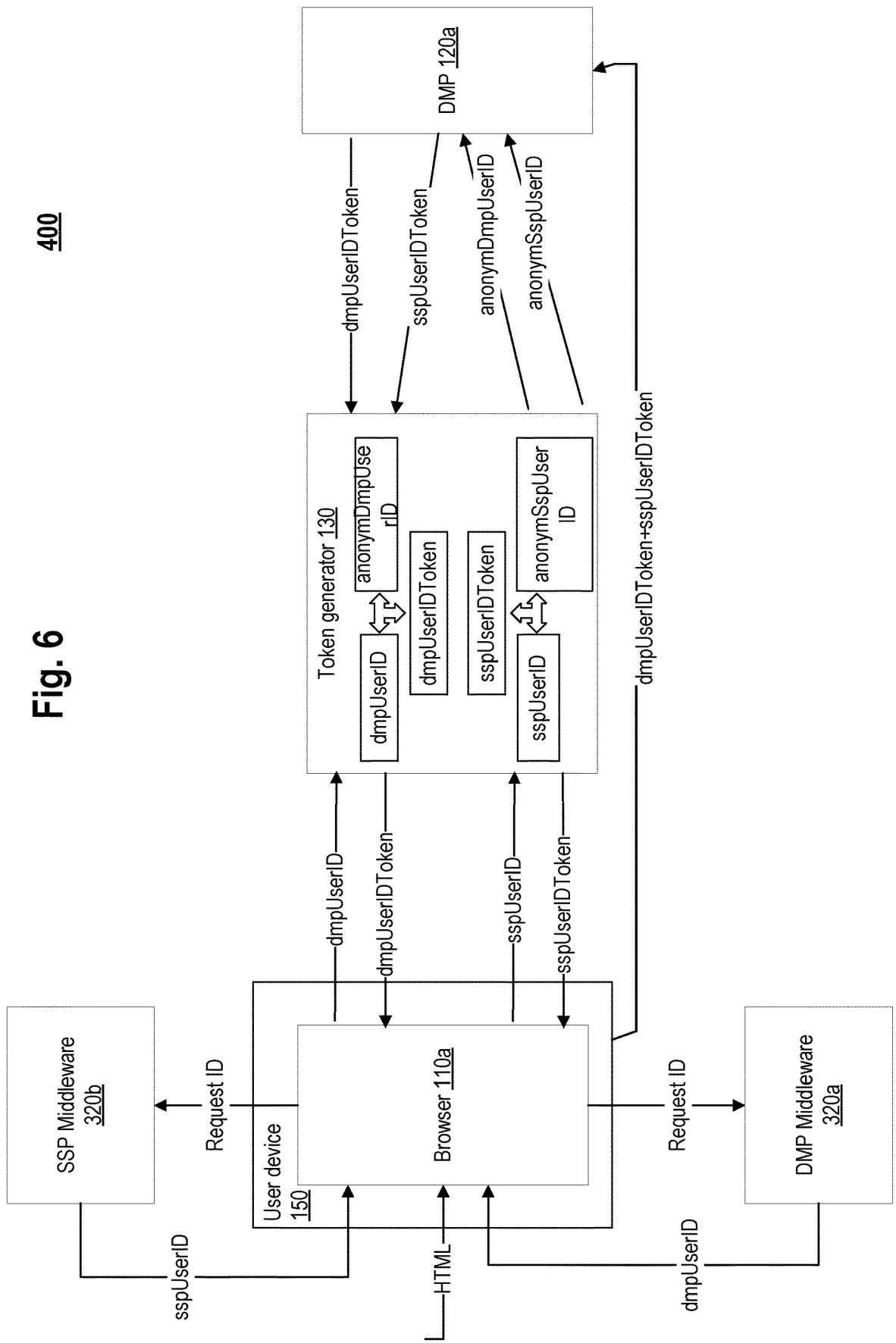
FIG. 6 illustrates an exemplary implementation of the method for synchronization of anonymous identifiers in accordance with aspects of the present disclosure.

FIG. 6 illustrates an exemplary implementation of the method for synchronization of anonymous identifiers in accordance with aspects of the present disclosure. FIG. 6 shows an exemplary aspect that illustrates the synchronization of identifiers from an SSP and from a DMP. In step 212a, the browser 110a sends out requests to obtain an identifier to the SSP Middleware 320b and the DMP Middleware 320a. The system 320a generates the identifier dmpUserID, and the system 320b generates the identifier sspUserID. In step 212b, the generated identifiers are returned to the user device 150 whose browser 110a sent out the request. In step 220, the identifiers are sent to the token generator 130. The token generator 130 generates the anonymous identifiers. For dmpUserID, it generates anonymDmpUserID, and for sspUserID it generates anonymSspUserID. For each pair the random token is generated as follows:

dmp UserID-anonymDmp UserID→dmpUserIDToken;
ssp UserID-anonymSsp UserID→sspUserIDToken.

In step 230, the tokens sspUserIDToken and dmpUserIDToken are returned to the device 150. In step 242, the received tokens are combined at the device and sent to the DMP 120a. In step 250, the tokens are sent from the DMP to the token generator 130, where the tokens are mapped onto the anonymous identifiers.

In step 260, the anonymous identifiers anonymDmpUserID and anonymSspUserID are returned to the DMP, and the identifiers are linked in the DMP (synchronized) as identifying the same source in different systems 320.

Figure 7:
FIG. 7 illustrates a system for sending anonymous data in accordance with aspects of the present disclosure.

FIG. 7 illustrates a system 700 for sending anonymous data in accordance with aspects of the present disclosure. The system 700 is used for sending anonymous data and is analogous to the system 100. The system 700 contains a data modifier 140, designed to divide the data structures (which are formed for dispatching from the source 110 to the recipient 120). There may be various criteria for the division of a data structure into substructures, one such criterion being the presence of personal data (Personal Identification Information) or special categories thereof (in the terminology of the GDPR) in the sent data, whereby the data structure is divided up such that one substructure contains the personal data (hereinafter, PD, in English: PII) or special categories thereof, another substructure includes data which is not personal data.

The assigning of data to the personal data is dictated, for example, by laws of the country in whose jurisdiction the user of the device is located. The user of the device is the client in the system being described. In other words, the location of the data source is used for determining the jurisdiction. Another more common criterion is the presence of critical data. Critical data is data for which the law or an authorized entity imposes restrictions. For example, an authorized entity may restrict gathering, storage, accessing, dissemination, and processing of the critical data. This critical data is generally sensitive to divulging, dissemination, and leakage, and the occurrence of these events may lead to a violation of rights and lawful protection of interests of the persons. Liability may be enforced against those who commit infractions of the rules for gathering, storing, accessing and processing of such data. In the context of the present disclosure, the terms "confidential data" and "confidential information" are synonyms. A particular instance of critical data is confidential data (sensitive data). Confidential data refers to data which is protected in keeping with the legislation of the country in whose jurisdiction the user of the device (the client for the system being described) is located. Confidential data, in one aspect, includes personal data (PD) and data containing at least one of:

commercial secrecy;
tax secrecy;
banking secrecy;
medical secrecy;
notarial secrecy;
attorney secrecy;
audit secrecy;
communications secrecy;
insurance secrecy;
last testament secrecy;
adoption secrecy;
confessional secrecy;
investigational secrecy;
court proceedings secrecy;
information on protected persons; and
state secrecy.

FIG. 7 illustrates an example of a system for sending anonymous data, where:

the recipient 120 requests data from the source 110 (See e.g., step 210);
the source 110 sends a request to obtain an identifier to a management system 320 (See e.g., step 212a);
the management system 320 returns the requested identifier to the source 110 (See e.g., step 212b);
the source 110 sends the identifier to the token generator 130 (See e.g., step 220);
the source 110 sends critical data (See e.g., step 220a);
the token generator 130 returns the random token for the identifier to the source 110 (See e.g., step 230);
the token generator 130 returns the random token for the data to the source 110 (See e.g., step 230a);
the source 110 sends tokens and data, not being critical data, to the recipient 120 (See e.g., step 242);
the recipient 120 sends the tokens to the token generator 130 (See e.g., step 250);
the token generator 130 returns the anonymous identifier to the recipient 120 (See e.g., step 260); and
the token generator 130 returns the anonymous data to the recipient 110 (See e.g., step 261).

Figure 8:
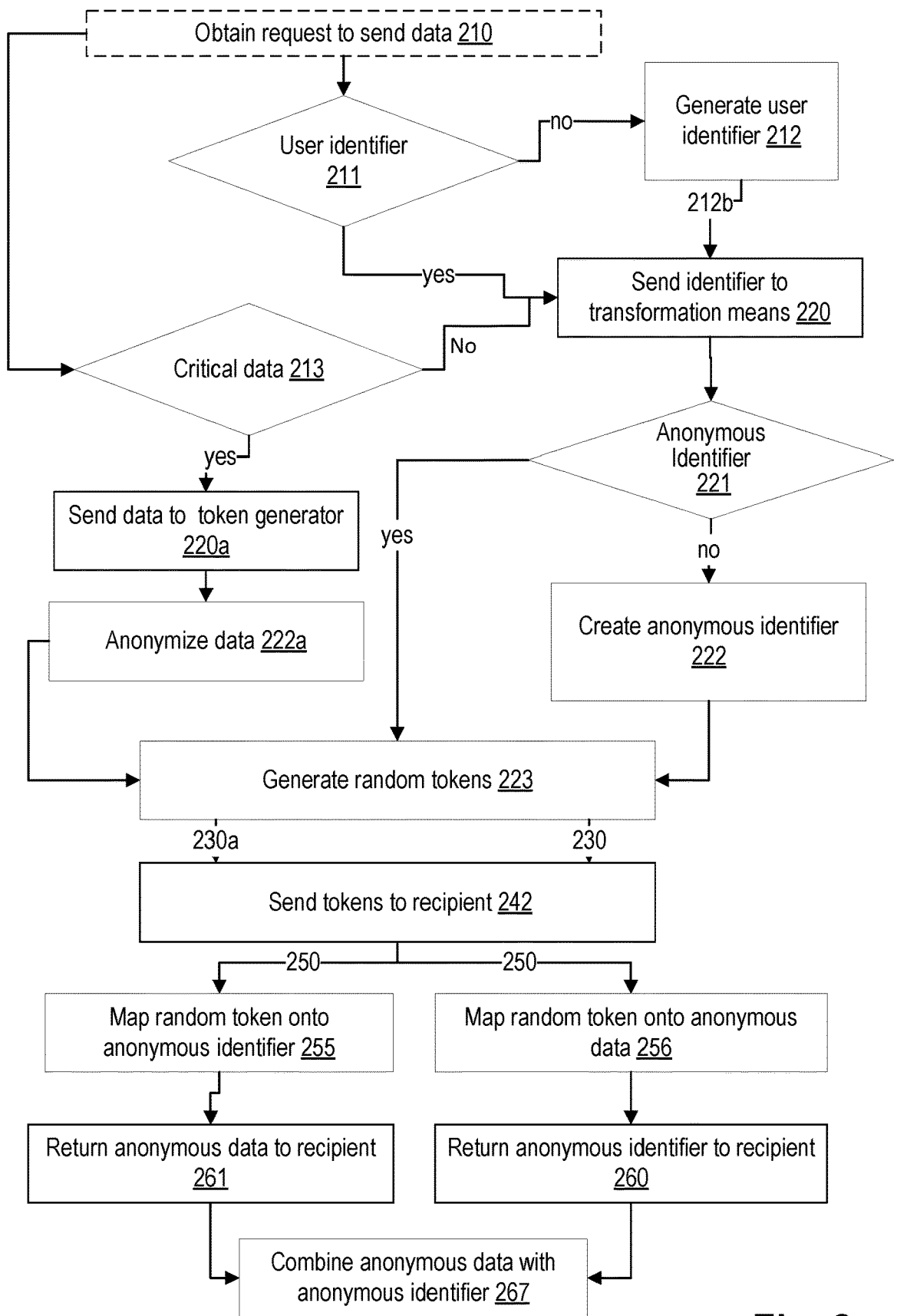
FIG. 8 illustrates a method for sending anonymous data in accordance with aspects of the present disclosure.

FIG. 8 illustrates a method 200 for sending anonymous data in accordance with aspects of the present disclosure.

In step 210, a source 110 receives a request from a recipient 120 to send data.

In one aspect, in step 211, method 200 determines whether or not the identifier of the user is absent. For example, the identifier may be determined as being absent when no cookie file has been installed. When the identifier is determined as being absent, the method proceeds to step 212. Otherwise, the method proceeds to step 220.

In step 212, method 200 generates the identifier of the user and sends it to the source 110. In one aspect, the identifier of the user is generated by the source 110. In another aspect, the identifier of the user is generated by a third party (such as: DMP, SSP, web server, database, etc.).

In step 213, method 200 determines whether or not critical data is present in the data intended to be sent from the source 110 to the recipient 120. If critical data is discovered, then method 200 proceeds to step 220a. Otherwise, method 200 proceeds to step 220.

In step 220a, method 200 sends the critical data to the token generator 130.

In step 220, method 200 sends the identifier of the user (either the identifier generated in step 212 or the existing one found in step 211) from the source to the token generator 130. Steps 220 and 220a may be performed synchronously or asynchronously. Then, the method proceeds to step 221.

In step 221, the token generator 130 determines whether an existing anonymous identifier is linked to the obtained identifier of the user. If there is no such linkage, the method proceeds to step 222. Otherwise, the method proceeds to step 223.

In step 222, method 200 generates an anonymous identifier and creates a first pair from the identifier of the user and the generated anonymous identifier. For example, the first pair may be created as "user identifier/anonymous identifier".

In step 222a, method 200 anonymizes, by the token generator, the obtained critical data and creates a second pair from the critical data and anonymous data. For example, the second pair may be generated as critical data/anonymous data.

In step 223, method 200 generates random tokens for the first and second pairs, e.g., for the pair user identifier/anonymous identifier and the pair critical data/anonymous data.

In step 230, the random token for the pair user identifier/anonymous identifier is returned to the source 110.

In step 230a, the random token for the pair critical data/anonymous data is returned.

In step 242, all the tokens of the source 110 and, in a particular instance, the noncritical data are sent to the recipient.

In step 250, the tokens are sent from the recipient to the token generator 130.

In step 255, the token generator 130 maps the token from the pair user identifier/anonymous identifier onto the anonymous identifier.

In step 256, the token generator 130 maps the token from the pair critical data/anonymous data onto the anonymous data.

In step 260, the anonymous identifier is returned to the recipient 120. In step 261, the anonymous data is returned to the recipient 120. Steps 260 and 261 may be performed synchronously or asynchronously.

In step 267, the recipient 120 combines the anonymous identifier, the anonymous data, and the noncritical data, if sent. In one aspect, if the anonymous identifier returned was already known to the recipient, the data received from the source 110 and the anonymous data received from the token generator by the token are saved in a structure previously created for this anonymous identifier; otherwise, a new structure is created for storage of the data linked to the anonymous identifier.

Figure 9:
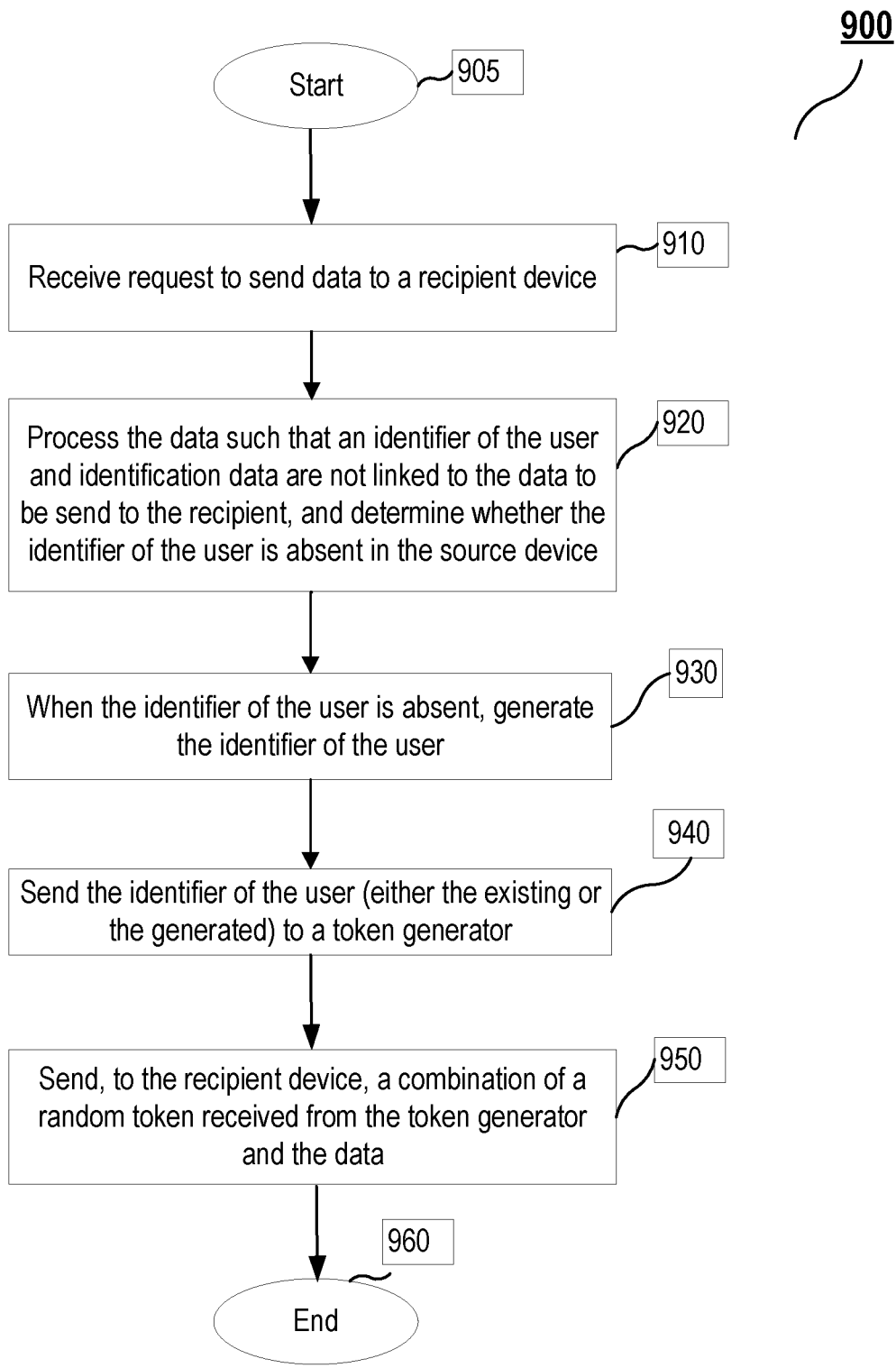
FIG. 9 illustrates an exemplary method for sending data from a source device to a recipient device in accordance with aspects of the present disclosure.

FIG. 9 illustrates an exemplary method 900 for sending data from a source device to a recipient device in accordance with aspects of the present disclosure. The method 900 is implemented by the device which is intending to send some data to the recipient device. The sending of the data may be initiated via a script installed in the sending device or as a result of a request for the data being received from the recipient device. Thus, there is interaction between the source and recipient devices. Both the source and recipient devices are also interacting with the token generator to enable that the data be sent to the recipient in an anonymized manner. Method 900 starts in step 905 and proceeds to step 910.

In step 910, method 900 receives a request to send data to the recipient device. In one aspect, the request for sending data to the recipient device is initiated when a script is being executed on the source device.

In step 920, method 900 processes the data such that an identifier of the user and identification data are not linked to the data to be sent to the recipient, and determines whether the identifier of the user is absent in the source device. In one aspect, determining whether the identifier of the user is absent in the source device comprises determining whether or not cookies have been installed on the source device. In one aspect, the processing of the data such that the identifier of the user and the identification data are not linked to the data to be sent to the recipient device includes: separating the identifier of the user and the identification data from the data to be sent, such that the identifier of the user and the identification data are unlinked from the data to be sent. In one aspect, the unlinking is performed by a data modifier.

In step 930, when the identifier of the user is absent, method 900 generates the identifier of the user. In one aspect, the identifier of the user is generated by the source device or by a third party, wherein when the identifier of the user is generated by the third party, the method further comprises: sending, from the third party, the generated identifier of the user to the source device.

In step 940, method 900 sends the identifier of the user (either the identifier generated in step 930 or the existing one found in step 920) to a token generator. Thus, the sent identifier comprises either the generated identifier (result of step 930) or an existing identifier found during the determination of whether the identifier is absent in the source device (in step 920).

In step 950, method 900 sends, to the recipient device, a combination of a random token received from the token generator and the data. Method 900 ends in step 960.

In turn, in one aspect, the token generator performs the following: determines whether an existing anonymous identifier is linked to the identifier of the user received from the source device when no link is found to an existing anonymous identifier, creates a pair of the received identifier of the user and an anonymous identifier (e.g., a pair user identifier/anonymous identifier), generates a random token either for the created pair (i.e., for the pair user identifier/anonymous identifier) or the existing pair, wherein the random token links the received identifier of the user to the anonymous identifier. when the random token is received from the recipient device, map the random token onto the anonymous identifier using the pair for which the token was generated, and return the anonymous identifier to the recipient device from which the random token is received. In one aspect, the identifier of the user is linked distinctly to the anonymous identifier. In another aspect, the identifier of the user is linked to the anonymous identifier via a one to many link, wherein one of the following is true: several identifiers of the user are linked to one anonymous identifier; identifiers of at least two users are linked to a same anonymous identifier; and several anonymous identifiers are linked to a same identifier of the user.

In one aspect, the method further comprises, by the recipient device: sending the random token received from the source device to the token generator, receiving, from the token generator, the anonymous the anonymous identifier, and combining the data received from the source device with the anonymous identifier received from the token generator. In one aspect, when the returned anonymous identifier is already known to the recipient device, the recipient device saves the data obtained from the source in a structure previously created for the known anonymous identifier. When the returned anonymous identifier is unknown to the recipient device, the recipient device creates a new structure for saving the data obtained from the source device in relation to the current anonymous identifier.

The technical result of the method of the present disclosure includes enabling obtaining of data by a recipient from a source anonymously. The advantage of the present disclosure is achieved by generating a random token by a token generator. The token is generated based on data from the source. In one aspect, identification data is used to the generate the token. In one aspect, the identification data includes data such as: user identifiers, data for creating unique fingerprints, unique fingerprints, an identifier in a data management platform, an identifier from a synchronization device. Based on the data from the source, an anonymous identifier is additionally generated, where the generated random token can be uniquely mapped, in a particular case, onto the anonymous identifier. The generated random token is combined with data at the source and sent to the recipient. On demand from the recipient, the token generator maps the random token onto the anonymous identifier and returns this to the recipient, where the anonymous identifier returned by the token generator is combined with data obtained from the source at the recipient.

The recipient and/or the source can be data management platforms, where the source is the sender of the data, and the recipient is the obtainer of the data. Thus, the source in a client/server architecture is the client, and the recipient is the server. The token generator is located on a network node different from the network of the recipient and/or the source. In a particular instance, the generating of the token is initiated by the source.

Figure 10:
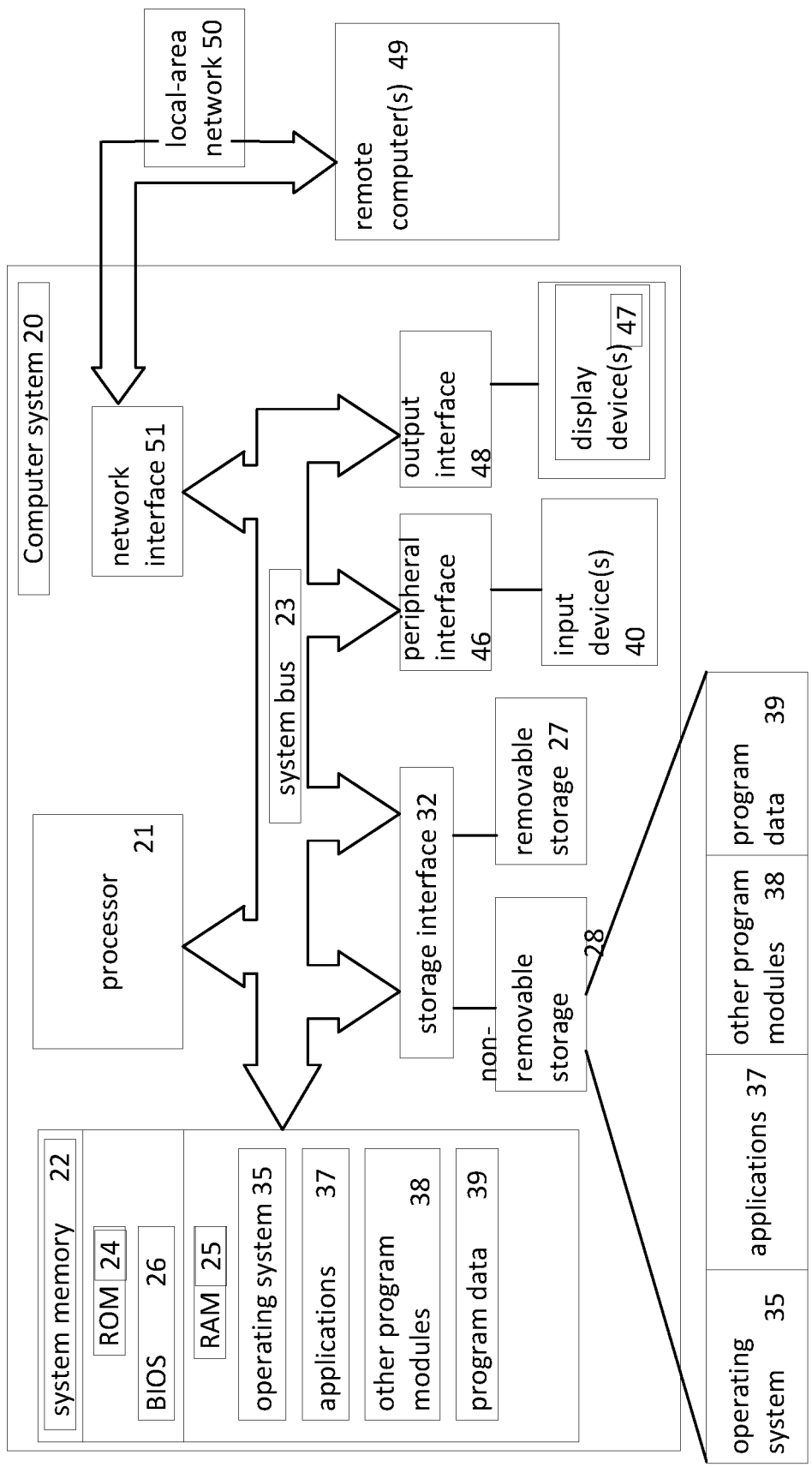
FIG. 10 presents an example of a general purpose computer system on which aspects of the present disclosure can be implemented.

FIG. 10 is a block diagram illustrating a computer system 20 on which aspects of systems and methods for anonymous sending of data from a source device to a recipient device may be implemented in accordance with exemplary aspects. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 10, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for anonymous sending of data from a source device to a recipient device, the method comprising:
   receiving, by the source device, a request to send data to the recipient device;
   processing, by the source device, the data such that an identifier of a user and identification data are not linked to the data to be sent to the recipient device, wherein the processing includes separating the identifier of the user and the identification data from the data to be sent, such that the identifier of the user and the identification data are unlinked from the data to be sent, and determining whether the identifier of the user is absent in the source device;

when the identifier of the user is absent, generating the identifier of the user;

sending the identifier of the user to a token generator, wherein the sent identifier comprises either the generated identifier or an existing identifier found during the determination of whether the identifier is absent in the source device; and sending, to the recipient device, a combination of a random token received from the token generator and the data, wherein the recipient device receives an anonymous identifier from the token generator, the random token linking the identifier of the user to the anonymous identifier.

2. The method of claim 1, further comprising:

determining, by the token generator, whether an existing anonymous identifier is linked to the received identifier of the user;

when no link is found to an existing anonymous identifier, by the token generator, creating a pair of the received identifier of the user and the anonymous identifier;

generating, by the token generator, a random token either for the created pair or an existing pair of the received identifier of the user and the existing anonymous identifier;

when the random token is received from the recipient device, by the token generator, mapping the random token onto the anonymous identifier using the pair for which the token was generated; and returning, by the token generator, the anonymous identifier to the recipient device from which the random token is received.

3. The method of claim 1, wherein the identifier of the user is linked distinctly to the anonymous identifier.

4. The method of claim 1, wherein the identifier of the user is linked to the anonymous identifier via a one to many link, wherein one of the following is true:

several identifiers of the user are linked to one anonymous identifier;

identifiers of at least two users are linked to a same anonymous identifier; and several anonymous identifiers are linked to a same identifier of the user.

5. The method of claim 1, wherein the request for sending data to the recipient device is initiated when a script is being executed on the source device.

6. The method of claim 1, wherein the determination of whether the identifier of the user is absent in the source device comprises: determining whether or not cookies have been installed on the source device.

7. The method of claim 1, wherein the unlinking is performed by a data modifier.

8. The method of claim 1, wherein the identifier of the user is generated by the source device or by a third party, wherein, when the identifier of the user is generated by the third party, the method further comprises:

sending, from the third party, the generated identifier of the user to the source device.

9. A system for anonymous sending of data from a source device to a recipient device, comprising:

at least one hardware processor of the source device configured to:

receive a request to send data to the recipient device;

process the data such that an identifier of a user and identification data are not linked to the data to be sent to the recipient device, wherein the processing includes separating the identifier of the user and the identification data from the data to be sent, such that the identifier of the user and the identification data are unlinked from the data to be sent, and determine whether the identifier of the user is absent in the source device;

when the identifier of the user is absent, generate the identifier of the user;

send the identifier of the user to a token generator, wherein the sent identifier comprises either the generated identifier or an existing identifier found during the determination of whether the identifier is absent in the source device; and send, to the recipient device, a combination of a random token received from the token generator and the data, wherein the recipient device receives an anonymous identifier from the token generator, the random token linking the identifier of the user to the anonymous identifier.

10. The system of claim 9, further comprising:

at least one hardware processor of a computing device usable for generating tokens configured to:

determine whether an existing anonymous identifier is linked to the received identifier of the user;

when no link is found to an existing anonymous identifier, create a pair of the received identifier of the user and the anonymous identifier;

generate a random token either for the created pair or an existing pair of the received identifier of the user and the existing anonymous identifier;

when the random token is received from the recipient device, map the random token onto the anonymous identifier using the pair for which the token was generated; and return the anonymous identifier to the recipient device from which the random token is received.

11. The system of claim 9, wherein the identifier of the user is linked distinctly to the anonymous identifier.

12. The system of claim 9, wherein the identifier of the user is linked to the anonymous identifier via a one to many link, wherein one of the following is true:

several identifiers of the user are linked to one anonymous identifier;

identifiers of at least two users are linked to a same anonymous identifier; and several anonymous identifiers are linked to a same identifier of the user.

13. The system of claim 9, wherein the request for sending data to the recipient device is initiated when a script is being executed on the source device.

14. The system of claim 9, wherein the determination of whether the identifier of the user is absent in the source device comprises: determining whether or not cookies have been installed on the source device.

15. The system of claim 9, wherein the unlinking is performed by a data modifier.

16. The system of claim 9, wherein the identifier of the user is generated by the source device or by a third party, wherein, when the identifier of the user is generated by the third party, the method further comprises:

sending, from the third party, the generated identifier of the user to the source device.

17. A non-transitory computer readable medium storing thereon computer executable instructions for anonymous sending of data from a source device to a recipient device, including instructions for:
- receiving, by the source device, a request to send data to the recipient device;
- processing, by the source device, the data such that an identifier of a user and identification data are not linked to the data to be sent to the recipient device, wherein the processing includes separating the identifier of the user and the identification data from the data to be sent, such that the identifier of the user and the identification data are unlinked from the data to be sent, and determining whether the identifier of the user is absent in the source device;
- when the identifier of the user is absent, generating the identifier of the user;
- sending the identifier of the user to a token generator, wherein the sent identifier comprises either the generated identifier or an existing identifier found during the determination of whether the identifier is absent in the source device; and
- sending, to the recipient device, a combination of a random token received from the token generator and the data, wherein the recipient device receives an anonymous identifier from the token generator, the random token linking the identifier of the user to the anonymous identifier.

18. The non-transitory computer readable medium of claim 17, wherein the instructions further comprise instructions for executing by the token generator, the instructions being for:
- determining whether an existing anonymous identifier is linked to the received identifier of the user;
- when no link is found to an existing anonymous identifier, creating a pair of the received identifier of the user and the anonymous identifier;
- generating a random token either for the created pair or an existing pair of the received identifier of the user and the existing anonymous identifier;
- when the random token is received from the recipient device, mapping the random token onto the anonymous identifier using the pair for which the token was generated; and
- returning the anonymous identifier to the recipient device from which the random token is received.

19. The non-transitory computer readable medium of claim 17, wherein the identifier of the user is linked distinctly to the anonymous identifier.

20. The non-transitory computer readable medium of claim 17, wherein the identifier of the user is linked to the anonymous identifier via a one to many link, wherein one of the following is true:
- several identifiers of the user are linked to one anonymous identifier;
- identifiers of at least two users are linked to a same anonymous identifier; and
- several anonymous identifiers are linked to a same identifier of the user.

\* \* \* \* \*